(12) United States Patent
Dennis et al.

(10) Patent No.: US 6,966,605 B2
(45) Date of Patent: *Nov. 22, 2005

(54) BILATERAL, WARP-TOLERANT, CROSS-SYNCHRONIZED, GEAR-LOCK ADJUSTABLE SEAT STRUCTURE

(75) Inventors: Michael R. Dennis, Scappoose, OR (US); Gerhard Paasche, Scappoose, OR (US)

(73) Assignee: MJD Innovations, Inc., Scappoose, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 10/921,051

(22) Filed: Aug. 18, 2004

(65) Prior Publication Data

US 2005/0017563 A1    Jan. 27, 2005

Related U.S. Application Data

(63) Continuation-in-part of application No. 10/426,096, filed on Apr. 29, 2003, now Pat. No. 6,827,403.

(51) Int. Cl.[7] .............................................. B60N 2/235
(52) U.S. Cl. .................................... 297/366; 297/367
(58) Field of Search ................................ 297/366, 367

(56) References Cited

U.S. PATENT DOCUMENTS

| | | | |
|---|---|---|---|
| 3,902,757 A | 9/1975 | Yoshimura | |
| 4,146,267 A | 3/1979 | Mori et al. | |
| 4,541,672 A * | 9/1985 | Fukuta et al. ............... | 297/367 |
| 4,875,735 A | 10/1989 | Moyer et al. | |
| 5,138,744 A | 8/1992 | Coggon | |
| 5,154,476 A | 10/1992 | Haider et al. | |
| 5,433,507 A | 7/1995 | Chang | |
| 5,474,360 A | 12/1995 | Chang | |
| 5,522,643 A | 6/1996 | Matsuura | |
| 5,588,705 A | 12/1996 | Chang | |
| 5,590,932 A | 1/1997 | Olivieri | |
| 5,622,410 A | 4/1997 | Robinson | |
| 5,690,386 A | 11/1997 | Chabanne | |
| 5,722,730 A | 3/1998 | McKernan | |
| 5,733,007 A | 3/1998 | Williams | |
| 5,733,008 A | 3/1998 | Tame | |
| 5,749,624 A * | 5/1998 | Yoshida ...................... | 297/367 |
| 5,749,625 A | 5/1998 | Robinson | |
| 6,007,153 A * | 12/1999 | Benoit et al. ........... | 297/367 X |

(Continued)

FOREIGN PATENT DOCUMENTS

DE          3323539 A1      1/1985

(Continued)

*Primary Examiner*—Rodney B. White
(74) *Attorney, Agent, or Firm*—Jon M. Dickinson PC; Robert D. Varitz PC

(57) ABSTRACT

A seat structure with two, lateral-side latching-unlatching mechanisms for enabling smoothly operating releasable locking and unlocking actions between a seat-base and an inclinable seat-back hinged to the seat-base in the seat structure. Two interengageable arcs of gear teeth forming part of each mechanism engage and release selectively under rocker-lever seat-occupant control to lock and unlock the seat-back for inclinational fixation and adjustment, and, as determined by tooth-pitch in the arcs, enable positive locking to take place in a large number of specific, small-angular-difference, seat-back inclinations. A floating cross-shaft, and two rocker cams joined thereto, interconnect the two lateral side mechanisms. The seat-base is fully twist-deformable in a catastrophic event replicating a conventional rack-and-roll test without the seat-back becoming unlocked relative to the seat-base.

8 Claims, 8 Drawing Sheets

U.S. PATENT DOCUMENTS

| | | |
|---|---|---|
| 6,095,608 A * | 8/2000 | Ganot et al. ................. 297/367 |
| 6,139,105 A | 10/2000 | Morgos et al. |
| 6,209,955 B1 | 4/2001 | Seibold |
| 6,273,508 B1 | 8/2001 | Lange |
| 6,543,849 B1 * | 4/2003 | Yamada .................. 297/367 X |
| 6,598,938 B2 | 7/2003 | Boltze et al. |
| 6,659,558 B2 | 12/2003 | Sugimoto |
| 6,827,403 B2 * | 12/2004 | Paasche et al. ............. 297/366 |
| 2002/0008419 A1 | 1/2002 | Boltze et al. |
| 2002/0043853 A1 | 4/2002 | Shephard |
| 2002/0050733 A1 | 5/2002 | Hansel et al. |
| 2002/0153755 A1 | 10/2002 | Sugimoto |
| 2003/0025375 A1 | 2/2003 | Gray |
| 2003/0042780 A1 | 3/2003 | Klein et al. |
| 2003/0062755 A1 | 4/2003 | Klein et al. |
| 2003/0160490 A1 | 8/2003 | Nock |

FOREIGN PATENT DOCUMENTS

| | | |
|---|---|---|
| EP | 6610 A1 | 1/1980 |
| EP | 7107 A1 | 1/1980 |
| GB | 2085959 A | 5/1982 |

* cited by examiner

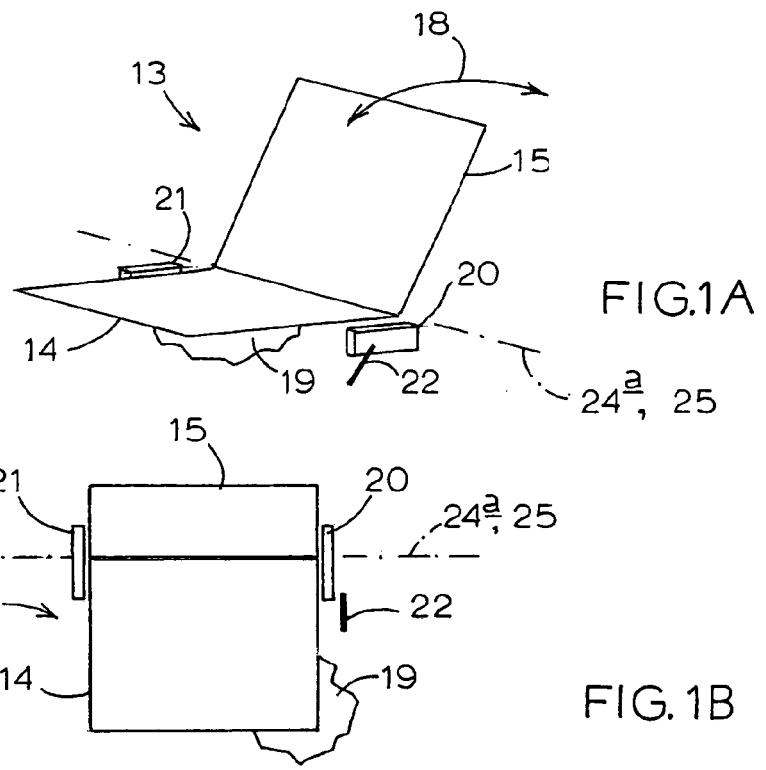
FIG.1A
FIG.1B
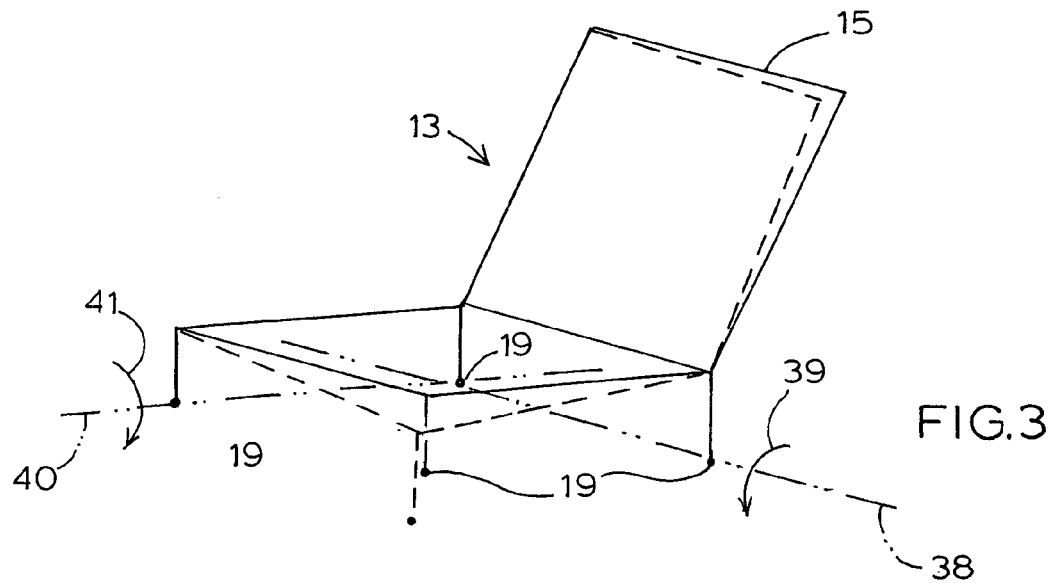
FIG.3

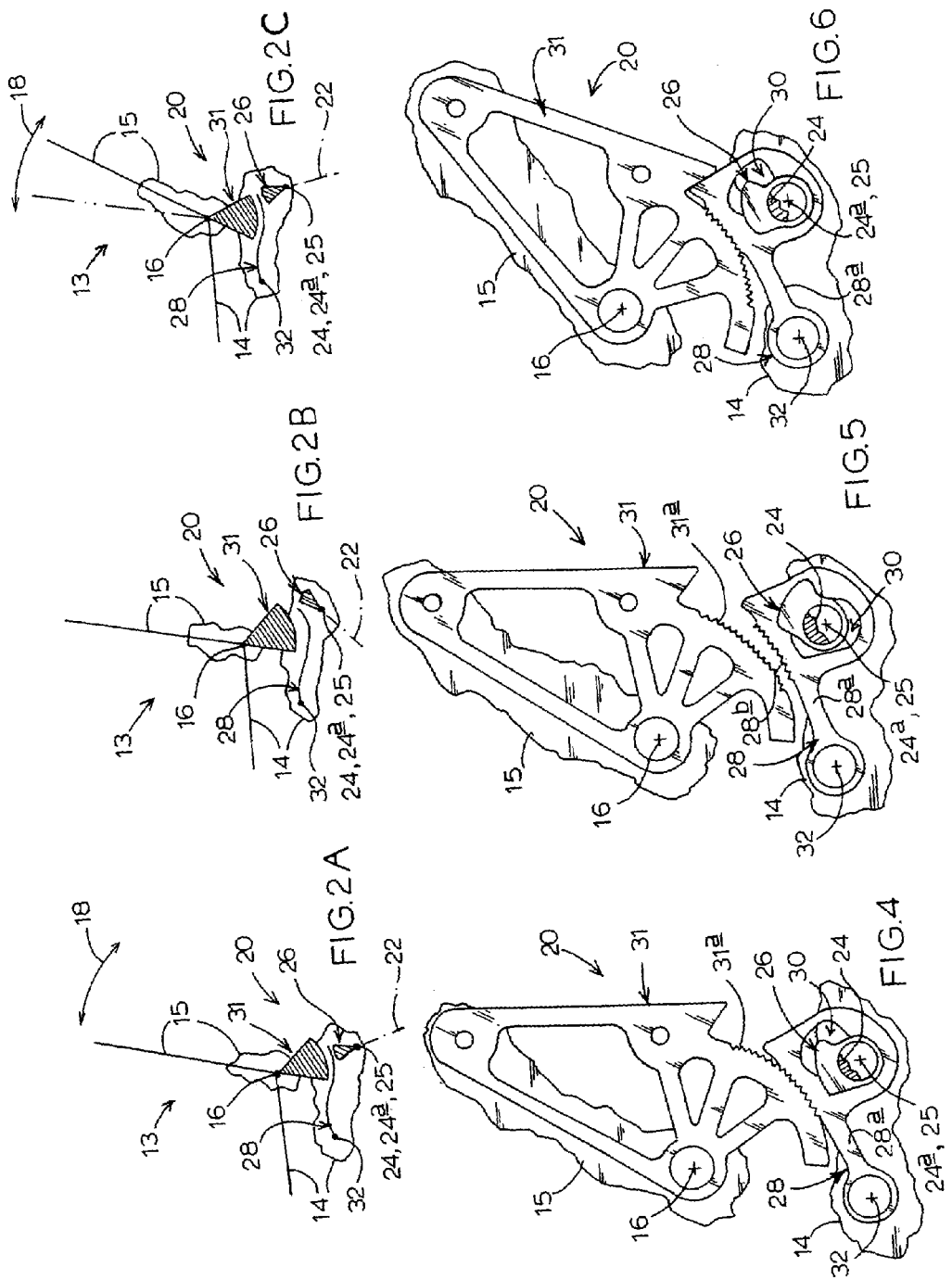

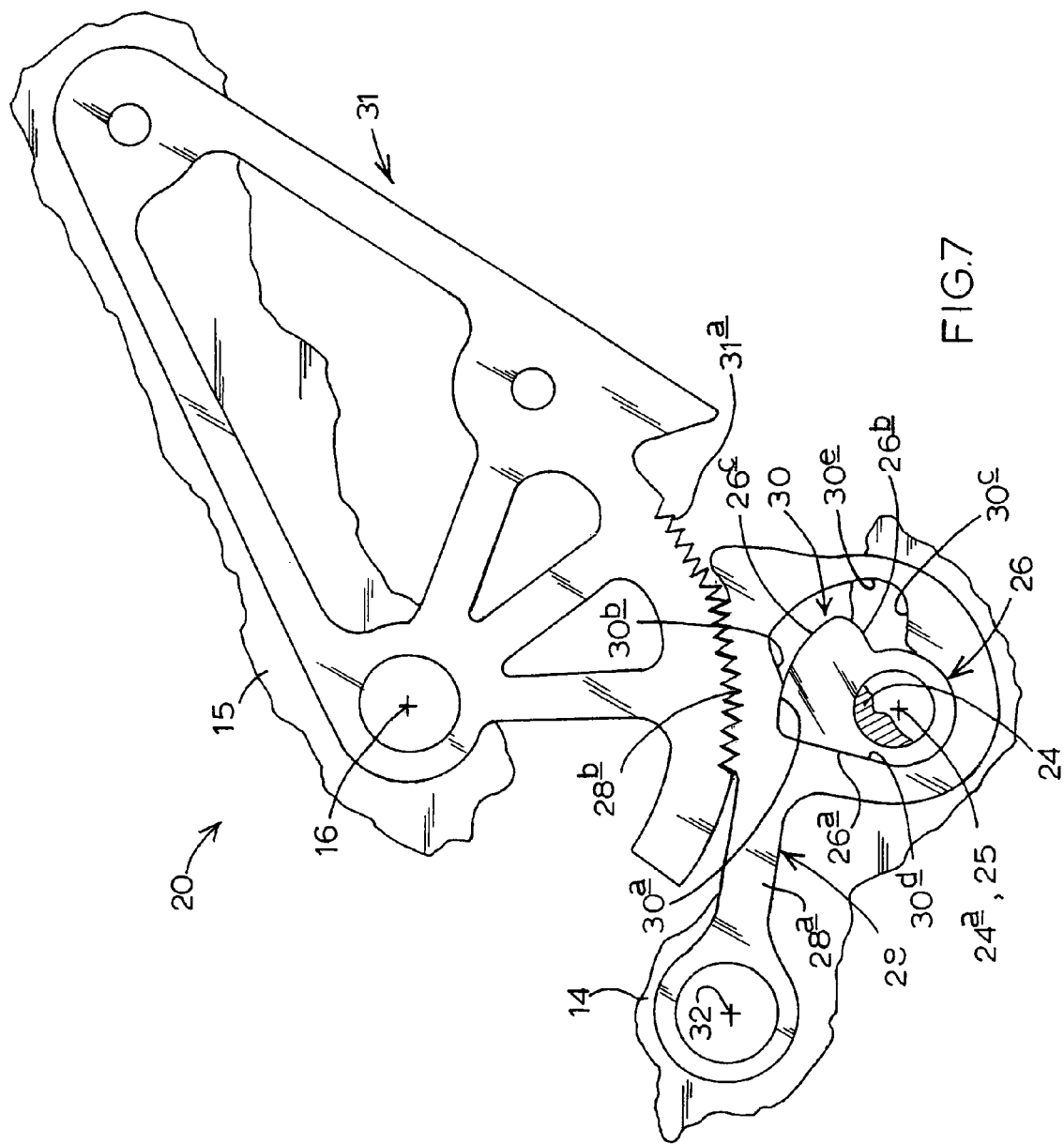

BILATERAL, WARP-TOLERANT, CROSS-SYNCHRONIZED, GEAR-LOCK ADJUSTABLE SEAT STRUCTURE

CROSS-REFERENCE TO RELATED APPLICATION

This application is a continuation-in-part of prior filed U.S. patent application Ser. No. 10/426,096, filed Apr. 29, 2003 now U.S. Pat. No. 6,827,403 by Gerhard Paasche et al. for "Gear-Lock Adjustable Seat-Back Inclination Structure".

BACKGROUND AND SUMMARY OF THE INVENTION

This invention relates to adjustable seat structure, and more particularly to bilateral, warp-tolerant, cross-synchronized, gear-lock mechanism for selectively adjusting, and for releasably gear-locking, the inclination of a seat-back sub-structure (seat-back) in relation to a seat-base frame (seat-base) to which the seat-back is pivoted. While the invention has utility in many applications, it is described and illustrated herein in the setting of an aircraft passenger seat—a setting with respect to which its utility has been found to be especially well suited.

The terms "bilateral" and "cross-synchronized" refer to the facts (a) that substantially duplicate gear mechanisms are employed, one each on opposite lateral sides of a seat, and disposed at the general location of the pivot axis which is provided for angular adjustment (inclination) of such a seat-back sub-structure, and (b) that a shared, rotation-transmitting lateral shaft connects two cams in these two mechanisms for coordinated operation and interaction, as will be explained. The term "warp-tolerant" refers to the important fact that the mechanism of this invention easily accommodates, with a generous "margin of safety" still remaining, the well-known, relatively severe "rack and roll", orthogonal-axis, safety-qualifying twist test which certain passenger seats, such as those installed in aircraft, are required to pass.

As will be seen, the two, lateral-sides mechanisms of this invention each includes a unique, combined lever, gear and cam arrangement which operates smoothly, and bi-directionally positively, to free and anchor a seat-back selectively at a plurality of different inclinations relative to the associated seat-base. Much of the description given herein for the present invention is presented, for simplicity sake, in the context of just a single one of these mechanisms. Both mechanisms, however, are discussed at appropriate places where necessary to understand the cooperative interactions which take place between them.

According to the preferred and best mode embodiment of the invention which is specifically illustrated and described herein, three spaced, substantially parallel hinge, or pivot, axes play cooperative roles in the structure and operation of the laterally spaced mechanisms of the invention. One of these axes (the seat-back rock axis) is that with respect to which the seat-back swings, inclines, rocks, etc., reciprocally relative to the seat-base. In each lateral mechanism, a special rocker gear, which possesses an arc of gear teeth, is pivoted on this same axis. The rocker gear is anchored to the seat-back for movement as a unit therewith, and its arc of gear teeth follows a circular, chordal path (approximately 30°) which is radially centered on the seat-back rock axis.

A second axis is one on which a rockable latch element in each lateral mechanism, which element also possesses an arc of gear teeth, is pivoted for reciprocal rocking relative to the seat-base. The teeth in this latch element confrontingly face the teeth in the rocker gear, are distributed along a chordal, circular arc (about 20°) which has a radius of curvature substantially the same as that of the arc of teeth in the rocker gear, and, because both sets of teeth have the same (common) tooth-pitch, are freely meshable and de-meshable with the rocker gear teeth. The arc of teeth in the latch element is not fixedly centered on any of the mentioned, three pivot axes. Rather, the teeth in this second-mentioned arc swing, with rocking of the latch element, about the mentioned "second" axis. The latch element in each lateral mechanism, within its perimeter, is formed with a specially shaped void space which functions, as will be explained, to furnish special cam-follower dwell and drive surfaces (structures) that play roles in the operation of the invention.

The third axis defines a rock/pivot axis for a cam, or cam structure, in each lateral mechanism, which cam structure is specially shaped, and disposed operatively within the latch element's void space for interaction therein with the mentioned cam-follower dwell and drive surfaces. This cam structure is anchored to a rock-axis-sharing elongate shaft which carries, near one (or both of its) end(s), a user (seated person) manipulable lever which is employable to operate the mechanism of the invention. This shaft extends between the opposite lateral sides of a seat structure, and acts as a torque and rotation transmitting agency between the two cams in the two lateral mechanisms. Because of this structural arrangement, both cams function as a unit with one another.

Various other features and advantages of the invention will become more fully apparent as the description which now follows is read in conjunction with the several drawing figures.

DESCRIPTION OF THE DRAWINGS

FIGS. 1A and 1B are very simplified lateral-isometric and top-plan views, respectively, of an aircraft seat having a seat-base, and pivoted thereto, a reciprocally inclinable seat-back which is pivoted to the seat-base, with this seat employing the preferred and best-mode embodiment of the present invention.

FIGS. 2A, 2B and 2C (second plate of drawings), are very simplified, schematic side elevations of the same aircraft passenger seat which is shown in FIGS. 1A and 1B. In solid lines in FIGS. 2A and 2B, the seat-back is shown in a fully forward inclination, and in FIG. 2C, in a fully rearward inclination. A dash-double-dot line in FIG. 2C helps visually to relate the fully forward and fully rearward inclinations.

FIG. 3 (first plate of drawings) schematically illustrates the above-mentioned rack and roll test involving seat-base twisting about two orthogonal axes—one extending laterally between the opposite sides of the associated seat, and the other extending as a fore-and-aft axis.

FIGS. 4–6, inclusive, show, on a larger scale than those employed in the first-described drawing figures, and for one only of the two mentioned lateral mechanisms, isolated side elevations picturing profile details of the preferred plural-component inclination adjustment mechanism which is constructed in accordance with the invention, and which is employed by the seat shown in FIGS. 2A, 2B and 2C. The relative positions of these components as they appear in FIGS. 4, 5 and 6, relate to the seat "conditions" illustrated, respectively, in FIGS. 2A, 2B and 2C.

FIGS. 7–11, inclusive, are even larger scale views of the adjustment mechanism of the invention illustrating several stages in the operation of this mechanism relating to inclination of the seat-back shown in FIGS. 2A, 2B and 2C from a fully forwardly inclined disposition to a fully rearwardly inclined disposition. The views presented in these five FIGS. (7–11) of the mechanism of the invention have a point of view which is slightly rotated relative to the point of view employed in FIGS. 4–6, inclusive. Specifically the mechanism components shown in FIGS. 7–11, inclusive, are rotated (as a group) clockwise relative to how they appear in FIGS. 4–6, inclusive.

DETAILED DESCRIPTION OF THE INVENTION

Figure 8:
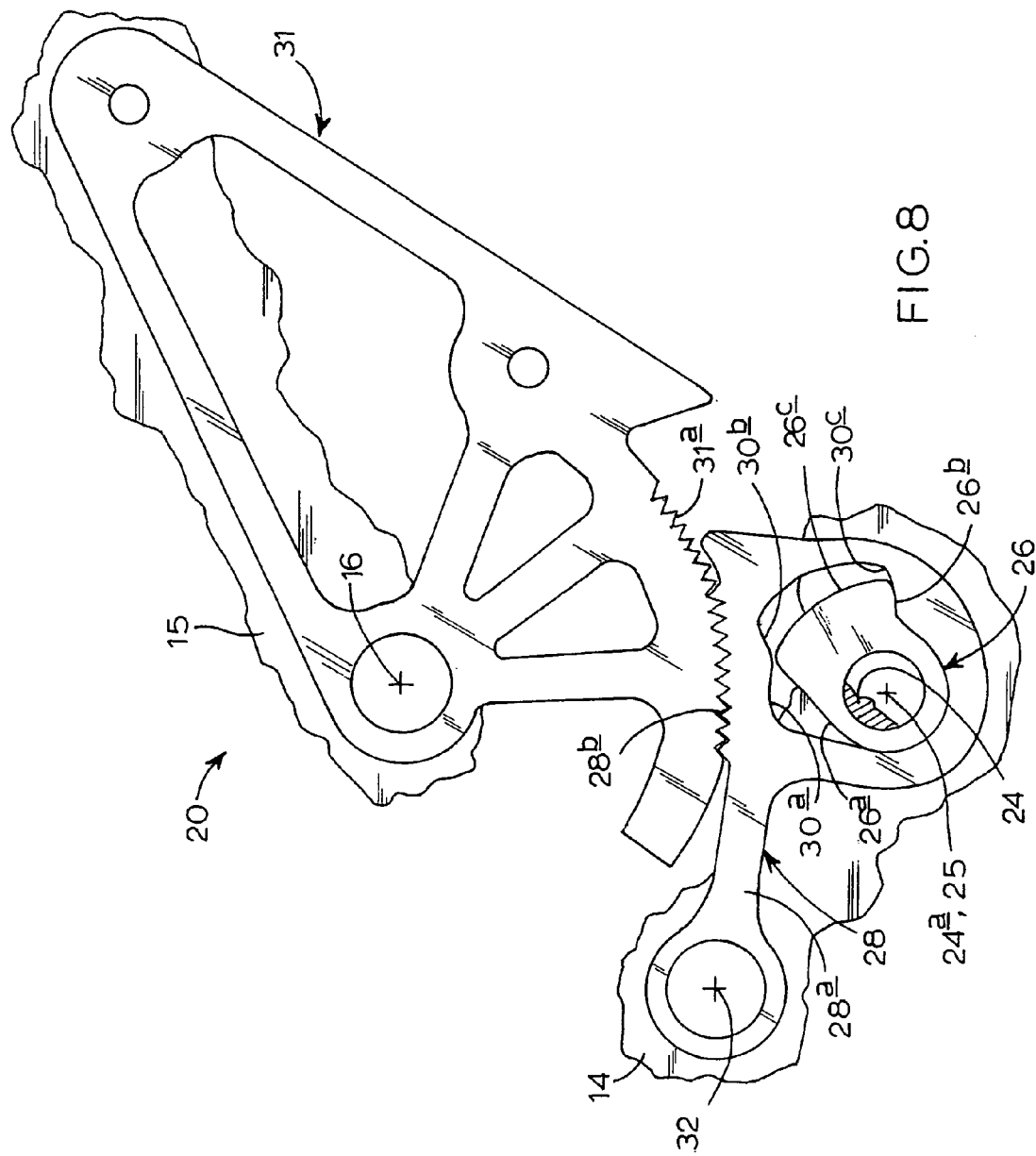

Turning now to the drawings, and referring first of all to FIGS. 1A–2C, inclusive, indicated generally at 13 is an aircraft passenger seat which includes a seat-base (or seat-base frame structure) 14, and a seat-back (or seat-back structure) 15. The seat-back is pivotally connected to the seat-base for reciprocal inclination about an axis (which is normally a horizontal axis, and which is also called herein a rock axis) 16, back and forth through a limited angle as indicated by double-headed curved arrow 18 in FIGS. 1A, 2A and 2C. The specific size for this angle, which is not critical, and as illustrated herein, is about 15°. In seat 13, the operative size of this angle is controlled essentially by the structure of the present invention. This will become clear shortly. Seat-base 14 is appropriately secured to the frame-anchored floor of an aircraft which is shown fragmentarily at 19.

Indicated generally at 20, 21 are two laterally spaced latch-release mechanisms, disposed on opposite sides of seat 13, and also called latching-unlatching mechanisms, which are similarly constructed in accordance with the preferred and best mode embodiment of the invention. Descriptions of these mechanisms will now go forward principally with reference to mechanism 20 which substantially also represents the structure of mechanism 21.

Mechanism 20 is located, as was just mentioned, adjacent one lateral side of seat 13. Mechanism 20 accommodates selective, releasably lockable, reciprocal, angular-positional adjustment of seat-back 15 relative to seat-base 14 through the angle just mentioned above. To effect such an adjustment, a person seated in seat 13 manipulates an exposed rocker lever 22 which is illustrated schematically by a thick, darkened line in FIGS. 1A and 1B, and by a dash-dot, downwardly projecting line in FIGS. 2A, 2B and 2C. Lever 22 which, in the embodiment of the invention now being described, has no counterpart in mechanism 21 (though it could), is secured near one end of, and to, an elongate, transverse shaft 24, or interconnect structure, that is appropriately journaled (or pivoted) on base 14 to turn about an axis 25 which coincides with its own (the shaft's) long axis 24a. Lever 22 is exposed and accessible at one, outer side of seat 13. It is shaft 24, under the control of lever 22, which introduces operative rotation (or rocking) into mechanism 20 (and also into mechanism 21). With regard to this just-described lever and shaft structure, it should be understood that other specific kinds of structural arrangements may be provided for allowing operation of mechanism 20, and in particular for enabling a seat occupant to introduce rocking rotation into this mechanism (and into mechanism 21).

In the embodiment of mechanism 20 herein illustrated, and now to be described, and including focus now on all of the drawing figures, there are three, principal interactive components (also called rock structures). These include a rocker cam 26 (also called a person-manipulable rocker cam), a latch, or latch element, 28 which includes within its perimeter boundary, as can clearly be seen in FIGS. 4–12, inclusive, a cut-out void space 30 that furnishes internal surfaces 30a, 30b, and 30c that function, as will be explained, as dwell, cam-follower (or cam-follower structure), and drive, surfaces, respectively, and a rocker gear 31. Two other internal surfaces, 30d, 30e, in void space 30 should be mentioned here. Surface 30d forms one "lateral" side of the void space. Surface 30e furnishes herein what is later referred to as a reception surface. Rocker cam 26 includes two angularly opposite "lateral" sides 26a, 26b, and another surface 26c which functions as a dwell surface that cooperates, as will later be explained, with dwell surface 30a in void space 30. Surfaces 30a, 30e are curved, have substantially the same radius of curvature, and are referred to herein as twin, like-radius follower surfaces.

Rocker cam 26, which is suitably joined, as by welding, to that end of shaft 24 which is adjacent the mechanism side of seat 13, is somewhat pie-shaped, with rounded corners. The rocker cam flairs angularly outwardly from shaft 24 along previously mentioned sides 26a, 26b, toward curved dwell surface 26c. Surface 26c herein is a surface of revolution curving about previously mentioned axis 25. The rocker cam is operatively disposed within void space 30. The assembly including shaft 24, cam 26, and the non-illustrated counterpart cam in mechanism 21, effectively "floats" in the structure of this invention relative to latch element 28, and to the counterpart latch element provided in mechanism 21.

Latch element 28 has the perimetral shape clearly illustrated for it in the drawings, and includes an extension arm 28a which is pivoted to seat-base 14 for reciprocal rocking about an axis 32. Axis 32 is spaced from, and disposed substantially parallel to, axes 16, 25. The preferred arrangement of these three spaced, generally parallel axes, relative to seat-base 14, is such that axes 25, 32 are below axis 16, with axis 25 being located rearwardly of axis 16, and axis 32 being located forwardly of axis 16.

Formed on the upper side of element 28 is an elongate, circularly-curved arc of teeth 28b. Arc 28b herein subtends an angle of about 15°, and curves about a non-illustrated axis which, because of the rocking capability that is intentionally provided for the latch element, is not fixed relative to seat-base 14. The radius of curvature of arc 28b is made to be substantially the same as the radius for curvature designed for an arc of somewhat similar teeth 31a provided in rocker gear 31. The term "somewhat similar" is employed to describe this arc relationship, inasmuch as arc 28b is concave, and arc 31a is matchingly convex. Arcs of teeth 28b and 31a are also referred to herein as row-sets of teeth.

Reciprocal rocking motions which are permitted interactively between rocker cam 26 and latch 28 are produced by manipulation of lever 22 and shaft 24. These motions are angularly limited, and the angular limit conditions/positions of these two elements can be seen especially well in FIGS. 7 and 11 in the drawings. These motions are independent of the condition/position of rocker gear 31. The limit conditions pictured depend principally on the respective radii of rocking provided for these two mechanism components, and upon the relationship which exists between the perimetral outline of cam 26 and that of void space 30.

How the perimetral configurations of cam 26 and void space 30 specifically relate, in the embodiment of mechanism 20 which is now being described, are herein-below now more fully explored.

Figure 9:
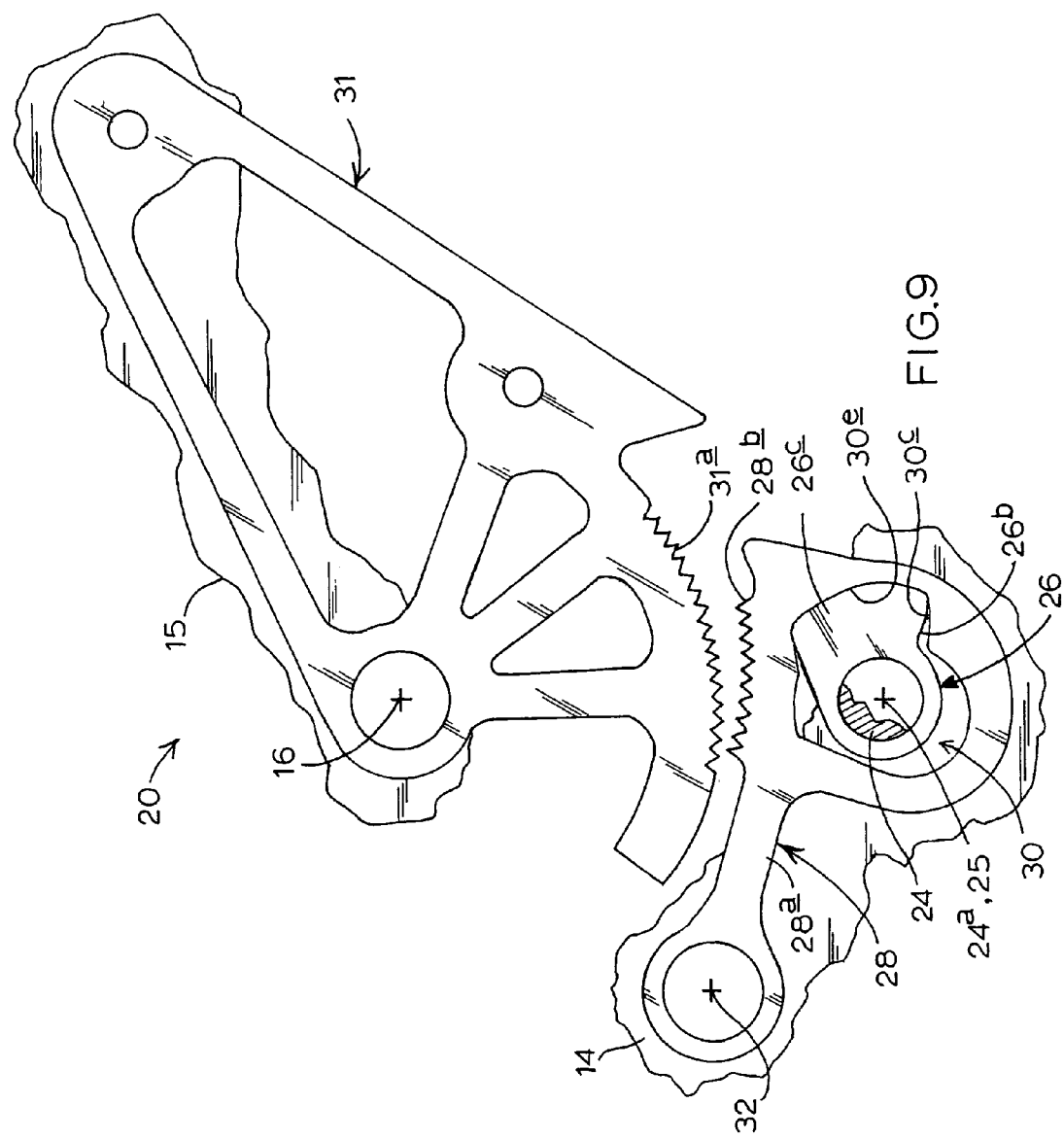

In a reasonable manner of thinking, the perimetral outline of void space 30 can be viewed as resulting from the overlapping, combined, axial foot-printing of the perimetral outline of cam 26 onto the side surface of latch element 28 under the two relative angular limit conditions that are pictured in FIGS. 7 and 9. In the FIG. 7 condition, side 26a in the rocker cam seats substantially matchingly in confronting contact with lateral side surface 30d in void space 30. Dwell surface 26c in the rocker cam seats substantially in matching confronting contact with dwell surface 30a in the void space. Dwell surface 30a has substantially the same radius of curvature as does dwell surface 26c.

In the FIG. 9 conditions, side 26b in the rocker cam seats substantially in confronting abutment with drive surface 30c in void space 30. Dwell surface 26c now substantially seats in matching confronting relationship with similarly curved reception surface 30e in the void space.

How various ones of the specifically identified surfaces in cam 26 and in void space 30 interact during reciprocal operation of mechanism 20 will be discussed shortly.

Rocker gear 31, suitably anchored to function as a unit with seat-back 15 herein, has the shape and configuration clearly pictured in the drawings. Arc 31a of teeth curves about axis 16, and subtends an angle of about 30°.

The teeth in arc 31a are configured to intermesh and lock with the teeth in arc 28b to create a condition referred to herein as compressive engagement between the teeth. Such intermeshing is plainly shown in FIGS. 4 and 6–8, inclusive, and 11 in the drawings. Intermeshing of these two arcs of teeth creates an angular positional lock for seat-back 15, pursuant to operation of the invention. Given the manner in which the opposite ends of arc 31a are structured, the absolute angular limits for relative, intermeshed locking between components 28, 31 is established substantially as the difference in angles that are respectively subtended by arcs 28b, 31a—herein about 15°. Thus it is that mechanism 20 positively establishes the range of "lockable" angular inclining which is permitted seat-back 15 relative to seat-base 14.

Reviewing now the operation of mechanism 20, and understanding that the same operation takes place in mechanism 21, this will be described with reference to all of the drawing figures. Within these figures, FIGS. 2A–2C, inclusive, 4–6, inclusive, and 7–11, inclusive, each (group) illustrates the events of unlocking seat-back 15 from seat-base 14, and inclining the seat-back rearwardly from its full forward locked inclination (the condition of mechanism 20 shown in FIGS. 2A, 2B, 4, 5 and 7–9, inclusive), to its full rearward locked inclination (the condition of mechanism 20 shown in FIGS. 2C, 6 and 11). In each of these two seat-back inclination conditions, the cam and cam-follower structures are said to be in opposed-surface locking engagement. Throughout all relative positions between the cam and cam-follower structures, these two structures remain contactively engaged.

From the condition pictured in FIGS. 2A, 4 and 7, a seat occupant manipulates lever 22 to rotate shaft 24 and rocker cam 26 clockwise about coincident axes 24a, 25. Throughout the first roughly 20°s of such rotation, dwell surfaces 26c, 30a slide past one another, with latch element 28 "dwelling" essentially unmoved (unrocked) from the position in which it is shown in FIGS. 2A, 4, 7 and 8. Contact of the dwell surfaces holds latch element 28 in place. This transition is seen especially well in FIGS. 7 and 8.

Just as surfaces 26c, 30a "clear" one another, which is the state of things pictured in FIG. 8—a state in which element 28 is no longer held in a fixed, dwell mode by these two surfaces, lateral side surface 26b in the rocker cam engages drive surface 30c in void space 30. Continued clockwise rotation of rocker cam 26, and by means of a driving engagement which now exists between surfaces 26b, 30a, causes driven clockwise rotation (rocking) of latch 28 about axis 32. As this driven rotation occurs, the radiused corner of intersection which exists between surfaces 26a, 26c in the rocker cam skirts in brushing contact substantially continuously along cam-follower surface 30b in void space 30, which cam-follower surface "follows" this radiused corner downwardly because of the rocking action occurring in latch element 28. This action is referred to herein as positive driving disengagement of the two arcs of gear teeth.

There thus exists the very useful condition that the rocker cam and the latch element essentially remain in a kind of positive, co-captured, driver-follower engagement throughout rocking motion.

Rocking continues until the rocking-motion limit condition pictured in FIGS. 2B, 5, 9 and 10 occurs, wherein dwell surface 26c closely confrontingly engages reception surface 30e in void space 30. At this point, a limit condition is reached because of the shapes of the interrelated structures of, and the natures of the surface engagements between, the rocker cam and latch element, and as a consequence, the rocker cam and the latch element can no further rotate clockwise about their respective rock axes 25, 32, respectively.

Figure 10:
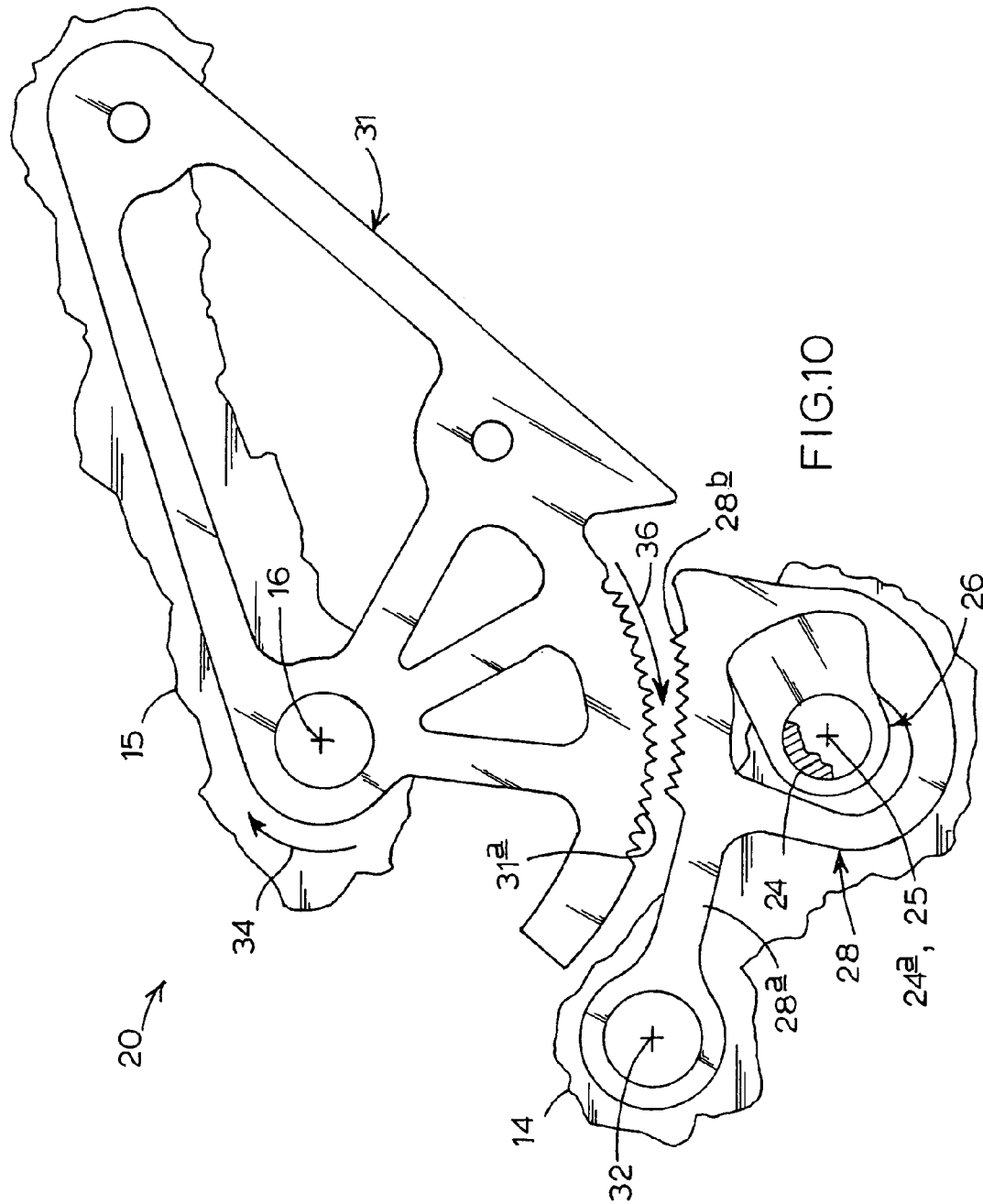
Figure 11:
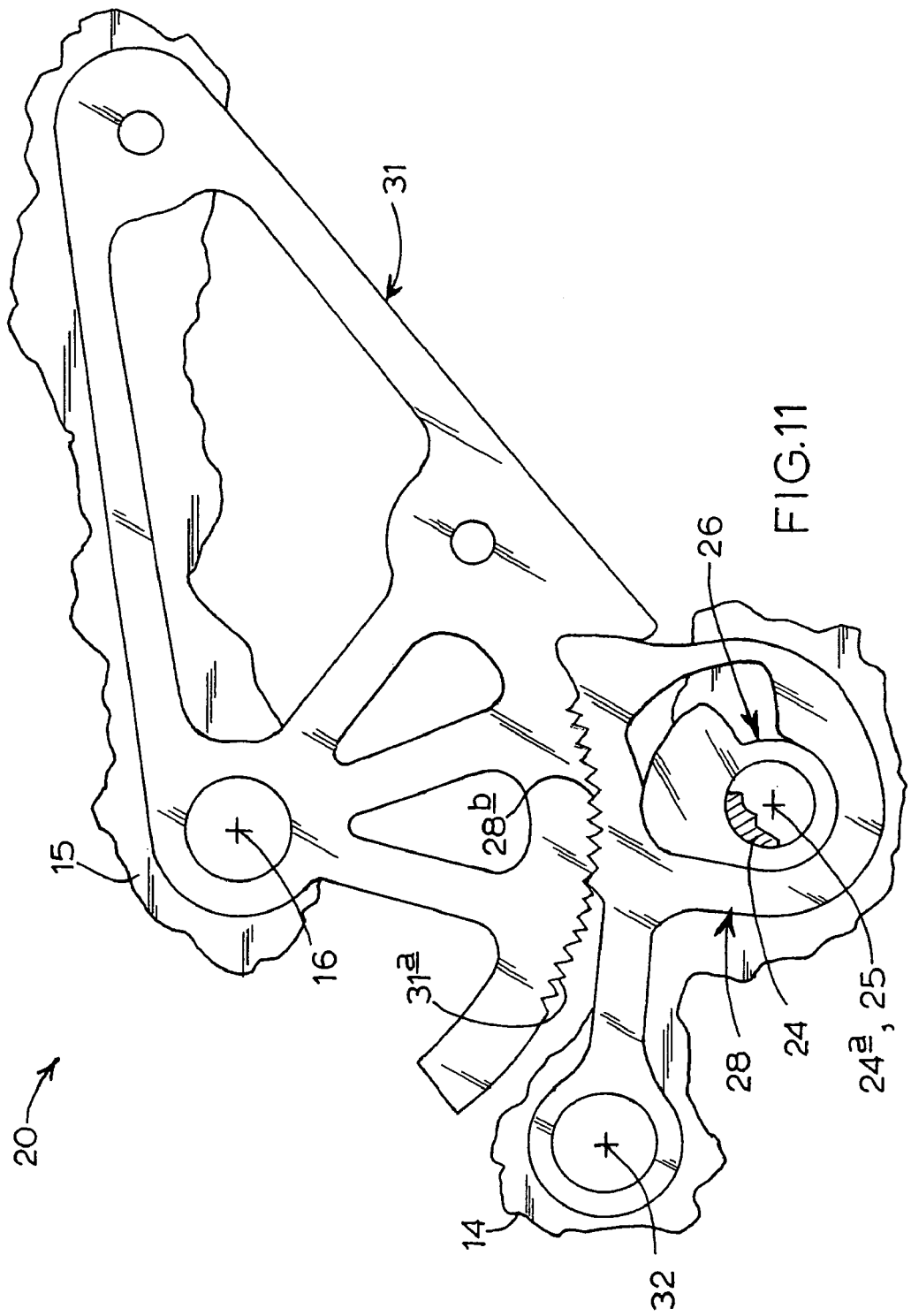
Figure 12:
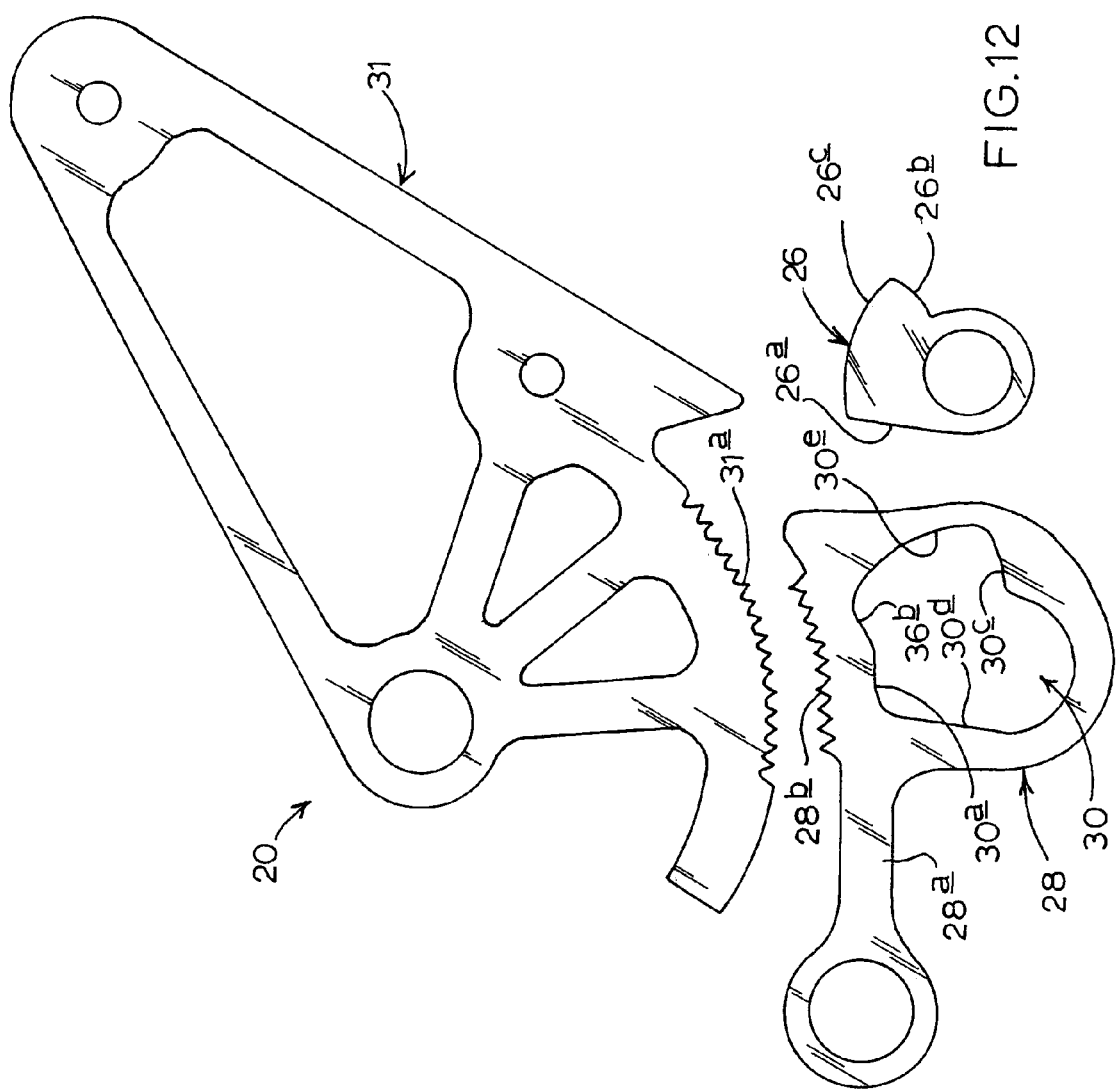
FIG. 12 isolates the several individual components of a single one of the two lateral adjustment mechanisms of this invention.

Under these circumstances, the two arcs of gear teeth are completely disengaged, and seat-back 15 is free to change inclination by rocking clockwise about axis 16 in the figures. FIG. 10 illustrates (by the changed position shown here for rocker gear 31 relative to the position shown for it in FIGS. 2A, 4, 5 and 7–9, inclusive, a situation where the seat-back has been inclined rearwardly about half way between its forward and rearward permitted-inclination limits. The direction of clockwise rotational inclining of the seat-back is indicated by arrows 34, 36.

When the seat-back has been adjusted to the inclination desired, and here, a full rearward inclination is being used as an example, the seat occupant again manipulates lever 22, this time to produce counter-clockwise rocking, or rotation, of shaft 24 and rocker cam 26 about axes 24a, 25. This counter, or reciprocal, rocking causes the cam to drive against cam-follower surface 30b to cause lifting, and counter-clockwise-driven rocking about axis 32, of latch element 28, thus to return the latch element to the position shown for it now in FIGS. 2C, 6 and 11, but with the arcs of teeth now intermeshing to lock seat-back 15 in its fully rearwardly inclined condition relative to seat-base 14.

Achieving "intermediate" seat-back inclinations is accomplished in a similar manner.

Turning now to FIG. 3 wherein mechanisms 20, 21 have been removed for clarity reasons, this figure in dashed lines illustrates distortions which occur in seat-base 14 floor 19 (represented by large black dots in this figure), and thus when seat 13, at the region of attachment to floor 19, is subjected to severe twisting under the influence of the earlier-mentioned rack and roll test. This test involves floor twisting ±10° about each of the two orthogonal and generally horizontal axes shown at 38 (laterally extending) and 40 (fore-and-aft extending) Typical twisting about axis 38 is represented in FIG. 3 by a curved arrow 39, and about axis

40 by a curved arrow 41. Only downward twisting is specifically pictured in FIG. 3.

Principally because of the previously mentioned, somewhat "floating" construction proposed for shaft 24 and for the two united cams (such as cam 26 in mechanism 20, and the counterpart cam (not shown) in mechanism 21), twisting performed during a rack and roll test is accommodated without tooth disengagement taking place between the two "toothed/geared" components in at least one of mechanisms 20, 21. As a consequence, the structure of the present invention operates to keep seat-back 15 locked in its then angular position with respect to seat-base 14. This is a very important consideration relating to seated-occupant safety in the event of a catastrophic accident which causes severe twisting of the types mentioned in and of seat-base 14.

Accordingly, a preferred and best-mode embodiment of the adjustment mechanism of this invention has been fully described and illustrated herein. This is a "two sided" mechanism which uniquely enables releasable-locking selectable-inclination between a seat-back and a seat-base. The mechanism illustrated produces very smooth operation, with appropriate positive driving and following and engagements occurring between cam element 26 and latching element 28. The two selectively intermeshable arcs of teeth provided in the mechanism enable secure locking between a seat-back and a seat-base in a large number of different, small-angular-difference inclinations. These different inclinations are, of course, determined by the common tooth-pitch characteristics of the two employed arcs of gear teeth. Severe seat-base twisting can be tolerated without accidental unlocking of the seat-back.

Accordingly, while a preferred and best mode embodiment of the invention have been described and illustrated herein, it is appreciated that variations and modifications may be made without departing from the spirit of the invention.

We claim:

1. A pair of laterally opposite side, interconnected latching-unlatching mechanisms for accommodating lockable, selective, angular-position adjustment of a seat-back structure, which is mounted, effectively, on a seat-base frame structure for reciprocal rocking relative to such frame structure, throughout a defined angle of adjustment, and about a rock axis, each of said mechanisms comprising a rocker gear anchored for rocking motion as a unit with said seat-back structure about the rock axis, including a row-set arc of teeth radially centered on the rock axis, a latch element mounted on the seat base frame structure adjacent said rocker gear for rocking motion which is relative both to the seat-base frame structure, and to the seat-back structure, about an axis which is spaced from and generally parallel to the rock axis, said latch element including a row-set of teeth disposed in an arc having substantially the same radius of curvature as does the arc of teeth in said rocker gear, said two row-sets of teeth being disengageably meshable, meshing of said teeth locking said rocker gear, and thereby the seat-back structure, against rocking motion, and de-meshing of the teeth enabling such rocking motion, said latch element including, within its perimeter boundary, a cut-out void space which furnishes different dwell, cam-follower, and drive surfaces, a person-manipulable rocker cam mounted on said seat-base frame structure for counter-rotation relative to said seat-base frame structure, rocker gear, and latch element, and about an axis which is spaced from, and generally parallel to, said two, earlier-mentioned axes, captively, floatingly and operatively disposed within said void space, and contactively inter-engaged under all circumstances and in all rotational positions within the void space with at least one of said surfaces, said rocker cam being manipulable to one position enabling disengagement of said two row-sets of teeth, and to another position involving cam driving of said latch element by said rocker cam wherein said row-sets of teeth are engaged, and interconnect structure extending operatively between the two latching-unlatching mechanisms on opposite sides of such a seat-back structure, and uniting the cams in the two mechanisms for rocking as a unit.

2. The mechanisms of claim 1, each of which is constructed in such a manner, due to the captured condition of the associated rocker cam in the associated void space, that there is no independent relative motion that is permitted between the associated rocker gear and the associated latch element.

3. The mechanisms of claim 1, wherein, with respect to each mechanism, said row-sets of teeth are constructed in a manner whereby meshing and locking produced thereof and thereby includes the presence of compressive inter-engagement between the teeth in the two row-sets.

4. The mechanisms of claim 1, each of which is structured in such a manner that the manipulation of said person-manipulable rocker cam to produce disengagement of the associated two row-sets of teeth takes the form of a positive driving disengagement.

5. The mechanisms of claim 1, wherein, with respect to each mechanism, the structural relationship between said latch element, said void space, and said rocker cam is such that said rocker cam positively locks said latch element against inadvertent motion in each of said two positions identified for said rocker cam.

6. The mechanisms of claim 5, wherein the locking mentioned therein takes the form of opposed-surface-engagement locking.

7. The mechanisms of claim 1, wherein unlatching involves positive drive between the rocker gears and the latch elements, and latching involves camming drive between these same two components.

8. The mechanisms of claim 1, wherein each said cam-follower structure is formed with twin, like-radius curved surfaces joined by an intermediate flat surface.

* * * * *